United States Patent
Gwak et al.

(10) Patent No.: US 12,263,543 B2
(45) Date of Patent: Apr. 1, 2025

(54) WORKTABLE FOR LASER PROCESSING

(71) Applicant: Samsung Display Co., LTD., Yongin-si (KR)

(72) Inventors: Sunjoong Gwak, Cheonan-si (KR); Suchang Ryu, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 237 days.

(21) Appl. No.: 17/526,470

(22) Filed: Nov. 15, 2021

(65) Prior Publication Data
US 2022/0305596 A1    Sep. 29, 2022

(30) Foreign Application Priority Data
Mar. 23, 2021  (KR) .................... 10-2021-0037386

(51) Int. Cl.
| | |
|---|---|
| *B23K 37/04* | (2006.01) |
| *B23K 26/50* | (2014.01) |
| *B23K 101/40* | (2006.01) |
| *B23Q 3/08* | (2006.01) |

(52) U.S. Cl.
CPC .......... *B23K 37/0426* (2013.01); *B23K 26/50* (2015.10); *B23K 37/0461* (2013.01); *B23Q 3/088* (2013.01); *B23K 2101/40* (2018.08); *B23Q 2703/04* (2013.01)

(58) Field of Classification Search
CPC . H01L 21/6838; B23Q 2703/04; B23Q 3/088; B23K 26/702
See application file for complete search history.

(56) References Cited

U.S. PATENT DOCUMENTS

| | | | | |
|---|---|---|---|---|
| 2008/0229811 A1* | 9/2008 | Zhao | ................... | F16C 32/0603 73/104 |
| 2009/0179365 A1* | 7/2009 | Lerner | ................. | B25B 11/005 269/21 |
| 2010/0314894 A1* | 12/2010 | Watanabe | ......... | H01L 21/67132 248/346.03 |
| 2012/0241437 A1* | 9/2012 | Jeong | ..................... | B23K 26/38 219/443.1 |

(Continued)

FOREIGN PATENT DOCUMENTS

| | | | | |
|---|---|---|---|---|
| JP | 2012152774 A | * | 8/2012 | ........... B23K 26/032 |
| KR | 20160130337 A | * | 11/2016 | |
| KR | 10-1811683 | | 12/2017 | |

(Continued)

OTHER PUBLICATIONS

JP-2012152774-A (Kuriyama, Noriyoshi) Aug. 16, 2012 [retrieved on May 22, 2024]. Retrieved from Espacenet Database, translation by EPO and Google. (Year: 2024).*

*Primary Examiner* — John J Norton
*Assistant Examiner* — Franklin Jefferson Wang
(74) *Attorney, Agent, or Firm* — KILE PARK REED & HOUTTEMAN PLLC

(57) ABSTRACT

A worktable for laser processing includes a lower plate, internal blocks, and external blocks. The lower plate includes a first area, a second area surrounding the first area, and a third area surrounding the second area. The internal blocks are disposed on the lower plate in the first area and the external blocks are disposed on the lower plate in the third area. The external blocks surround the internal blocks.

19 Claims, 16 Drawing Sheets

(56) References Cited

U.S. PATENT DOCUMENTS

2017/0120379 A1* 5/2017 Choi ................. B23K 26/0622
2022/0037215 A1* 2/2022 Baek ................. G01N 21/9501

FOREIGN PATENT DOCUMENTS

| KR | 10-2018-0002959 | 1/2018 | |
|----|----|----|----|
| KR | 10-1876445 | 7/2018 | |
| KR | 20180002959 A | * 11/2018 | |
| WO | WO-2019097864 A1 | * 5/2019 | ............. B23K 26/00 |

* cited by examiner

WORKTABLE FOR LASER PROCESSING

CROSS-REFERENCE TO RELATED APPLICATION(S)

This application claims priority to and benefits of Korean Patent Application No. 10-2021-0037386 under 35 U.S.C. § 119, filed on Mar. 23, 2021, in the Korean Intellectual Property Office, the entire contents of which are incorporated herein by reference.

BACKGROUND

1. Technical Field

The disclosure relates to a worktable for laser processing.

2. Description of the Related Art

Recently, the semiconductor industry has made many advances in processing techniques such as cutting, scribing, or patterning of substrates such as semiconductor material substrates, piezoelectric material substrates, and glass substrates using lasers.

Laser beam processing is used to cut a cell. A laser processing of the cell involves placing the cell on a worktable and irradiating the laser beam at a desired position. A laser scanner for irradiating the laser beam to the cell is positioned above the worktable, and processing is performed by irradiating the laser beam while the laser scanner moves along a cutting line. When the laser beam is irradiated, the substrate is cut along the cutting line and separated into an effective cell portion that is inside of the cutting line and a dummy portion that is outside of the cutting line.

The dummy portion is discarded and is unnecessary, and therefore, a method for minimizing the dummy portion is being sought. The cutting shape of the substrate, for example, the shape of the cutting line may be changed, and the worktable for cell laser processing may be replaced with a worktable for laser processing corresponding to a new cutting line.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

Some embodiments of the disclosure provide a worktable for laser processing with improved reliability and usability.

According to an embodiment, a worktable for laser processing may include a lower plate including a first area, a second area surrounding the first area, and a third area surrounding the second area, internal blocks disposed on the lower plate in the first area, and external blocks disposed on the lower plate in the third area and surrounding the internal blocks.

According to an embodiment, the second area may have a uniform width. The second area may have a first polygonal shape and may include a side parallel to a first direction and another side parallel to a second direction intersecting the first direction.

According to an embodiment, the second area may have a uniform width. The second area may have a second polygonal shape and may include a side parallel to a first direction, another side parallel to a second direction intersecting the first direction, and another side parallel to a third direction intersecting the first direction and the second direction.

According to an embodiment, the internal blocks may include at least one internal block that is adjacent to the another side parallel to the third direction and may have a shape including a side parallel to the third direction.

According to an embodiment, the external blocks may include at least one external block that is adjacent to the another side parallel to the third direction and may have a shape including a side parallel to the third direction.

According to an embodiment, the internal blocks may include at least one internal block that is adjacent to the second area and has an outer shape determined according to a shape of the second area.

According to an embodiment, the external blocks may include at least one external block that is adjacent to the second area and has an outer shape determined according to a shape of the second area.

According to an embodiment, the internal blocks may include first internal blocks having a first shape and second internal blocks having a second shape. An outer shape of a combination of the first internal blocks and the second internal blocks may correspond to the first area.

According to an embodiment, the internal blocks may include first internal blocks having a first shape, second internal blocks having a second shape, and third internal blocks having a third shape. An outer shape of a combination of the first internal blocks, the second internal blocks, and the third internal blocks may correspond to the first area.

According to an embodiment, the external blocks may include first external blocks having a first shape and second external blocks having a second shape. An outer shape of a combination of the first external blocks and the second external blocks may correspond to the third area.

According to an embodiment, a workpiece including an effective cell portion and a dummy portion surrounding the effective cell portion may be disposed on the internal blocks and the external blocks. A boundary between the effective cell portion and the dummy portion may be defined as a cutting line. The cutting line may overlap the second area.

According to an embodiment, the internal blocks may be disposed on the lower plate. The external blocks may be disposed on the lower plate.

According to an embodiment, the internal blocks may contact each other.

According to an embodiment, the external blocks may contact each other.

According to an embodiment, a side surface of each of the internal blocks and a side surface of each of the external blocks may be inclined such that an area of an upper surface of each of the internal blocks is larger than an area of a lower surface of each of the internal blocks, and an area of an upper surface of each of the external blocks is larger than an area of a lower surface of each of the external blocks.

According to an embodiment, the lower plate may include a foreign material discharge passage overlapping the second area and formed inside the lower plate.

According to an embodiment, the lower plate may include support parts protruding from the lower plate in a direction of the internal blocks and the external blocks. Each of the support parts may include a through hole formed inside the support parts, the through hole being attached to the internal blocks and the external blocks.

According to an embodiment, a side surface of each of the support parts may be inclined such that an area of a lower surface of each of the support parts is larger than an area of an upper surface of each of the support parts.

According to an embodiment, each of the internal blocks may include a first suction passage formed inside the each of the internal blocks, and a first coupling portion attached to the through hole. An inside of the first coupling portion may be connected to the first suction passage of each of the internal blocks. Each of the external blocks may include a second suction passage formed inside the each of the external blocks, and a second coupling portion attached to the through hole. An inside of the second coupling portion may be connected to the second suction passage of each of the external blocks.

According to an embodiment, the through hole of one of the support parts, the first coupling portion of each of the internal blocks, the second coupling portion of each of the external blocks, the first suction passage of each of the internal blocks, and the second suction passage of each of the external blocks may be connected to each other and may have a vacuum state.

Since the internal blocks and the external blocks are separable from the lower plate, the internal blocks and the external blocks may be replaced to have a shape of the workpiece. When the shape of the workpiece is changed, time, cost, and effort may be minimized by replacing only a few blocks without replacing the entire worktable. Accordingly, the usability of the worktable for laser processing may be improved.

Each of the internal blocks and each of the external blocks may have a quadrangular truncated pyramid shape in which an area of an upper surface is larger than an area of the lower surface. Each of the support parts may have a quadrangular truncated pyramid shape in which an area of a lower surface is greater than an area of an upper surface. The inclined sides of the support parts and the blocks may allow easier discharge of foreign materials generated during laser processing. Accordingly, the reliability of the worktable for laser processing may be improved.

It is to be understood that both the foregoing general description and the following detailed description are examples that are intended to provide further explanation of the disclosure.

BRIEF DESCRIPTION OF THE DRAWINGS

The above and other aspects and features of the disclosure will become more apparent by describing in detail embodiments thereof with reference to the attached drawings, in which.

DETAILED DESCRIPTION OF THE EMBODIMENTS

Figure 1:
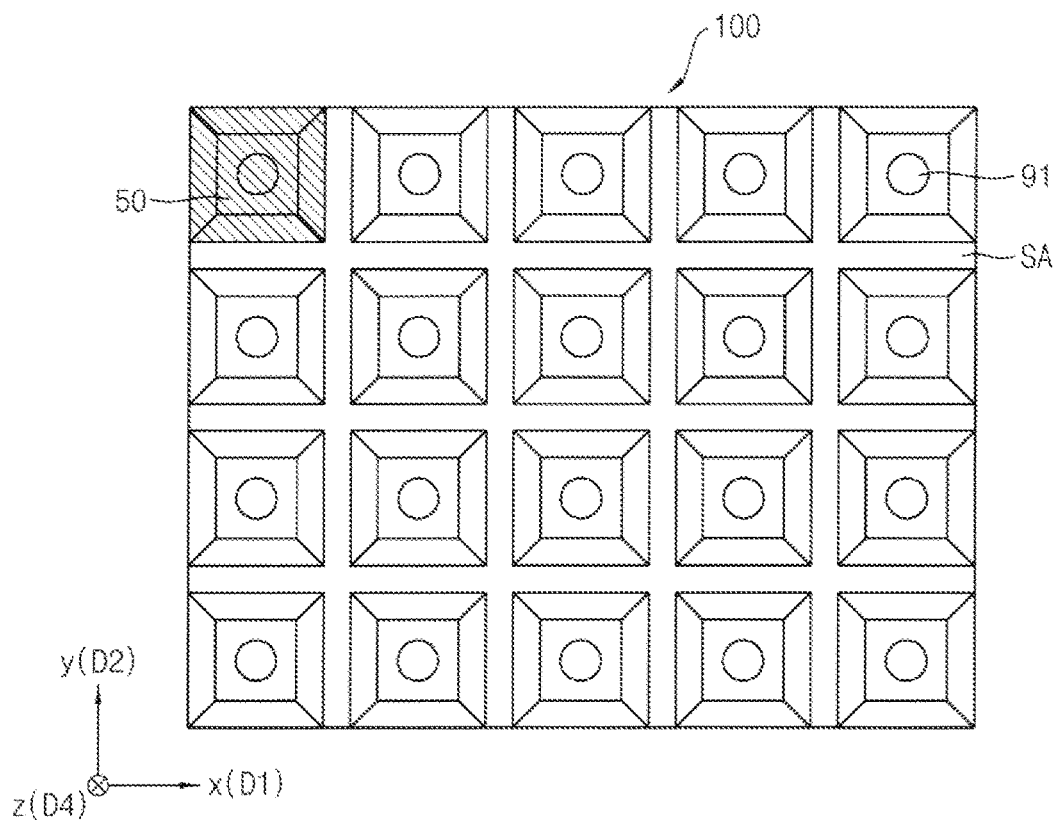
FIG. 1 is a schematic plan view illustrating a lower plate included in a worktable for laser processing according to an embodiment.

The disclosure will now be described more fully hereinafter with reference to the accompanying drawings, in which embodiments are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art.

In the drawings, sizes, thicknesses, ratios, and dimensions of the elements may be exaggerated for ease of description and for clarity. Like numbers refer to like elements throughout.

As used herein, the singular forms, "a," "an," and "the" are intended to include the plural forms as well, unless the context clearly indicates otherwise.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

In the specification and the claims, the phrase "at least one of" is intended to include the meaning of "at least one selected from the group of" for the purpose of its meaning and interpretation. For example, "at least one of A and B" may be understood to mean "A, B, or A and B."

It will be understood that, although the terms first, second, etc., may be used herein to describe various elements, these elements should not be limited by these terms. These terms are only used to distinguish one element from another element. For example, a first element may be referred to as a second element, and similarly, a second element may be referred to as a first element without departing from the scope of the disclosure.

The spatially relative terms "below", "beneath", "lower", "above", "upper", or the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in other directions and thus the spatially relative terms may be interpreted differently depending on the orientations.

The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art.

When an element is described as 'not overlapping' or 'to not overlap' another element, this may include that the elements are spaced apart from each other, offset from each other, or set aside from each other or any other suitable term as would be appreciated and understood by those of ordinary skill in the art.

The terms "comprises," "comprising," "includes," and/or "including,", "has," "have," and/or "having," and variations thereof when used in this specification, specify the presence of stated features, integers, steps, operations, elements, components, and/or groups thereof, but do not preclude the presence or addition of one or more other features, integers, steps, operations, elements, components, and/or groups thereof.

"About," "substantially," or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

It will be understood that when an element (or a region, a layer, a portion, or the like) is referred to as "being on", "connected to" or "coupled to" another element in the specification, it can be directly disposed on, connected, or coupled to another element mentioned above, or intervening elements may be disposed therebetween.

Unless otherwise defined, all terms (including technical and scientific terms) used herein have the same meaning as commonly understood by one of ordinary skill in the art to which the disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a plan view illustrating a lower plate 100 included in a worktable for laser processing according to an embodiment. An x-axis D1 and a y-axis D2 intersecting the x-axis D1 may define a plane.

Referring to FIG. 1, on the plane, a lower plate 100 may have a first polygonal shape including a side parallel to the x-axis D1 and a side parallel to the y-axis D2. The x-axis D1 and the y-axis D2 may be substantially perpendicular. The lower plate 100 may have a rectangular shape. The lower plate 100 may include support parts 50 arranged in a matrix form. The support parts 50 may protrude in a direction of a z-axis D4 perpendicular to the x-axis D1 and the y-axis D2. Each of the support parts 50 may have substantially the same shape and size. A through hole 91 may be formed in each of the support parts 50. Although a shape of the through hole 91 is illustrated as having a circular shape, the shape is not limited thereto. The support parts 50 may be spaced apart from each other. The support parts 50 may be spaced apart from each other at substantially the same distance. An area in which the support parts 50 are spaced apart from each other may be defined as a separation area SA. The separation area SA may have a grid pattern shape. The areas of the lower plate 100, except for an area where the support parts 50 are disposed, may be defined as the separation area SA.

Figure 2:
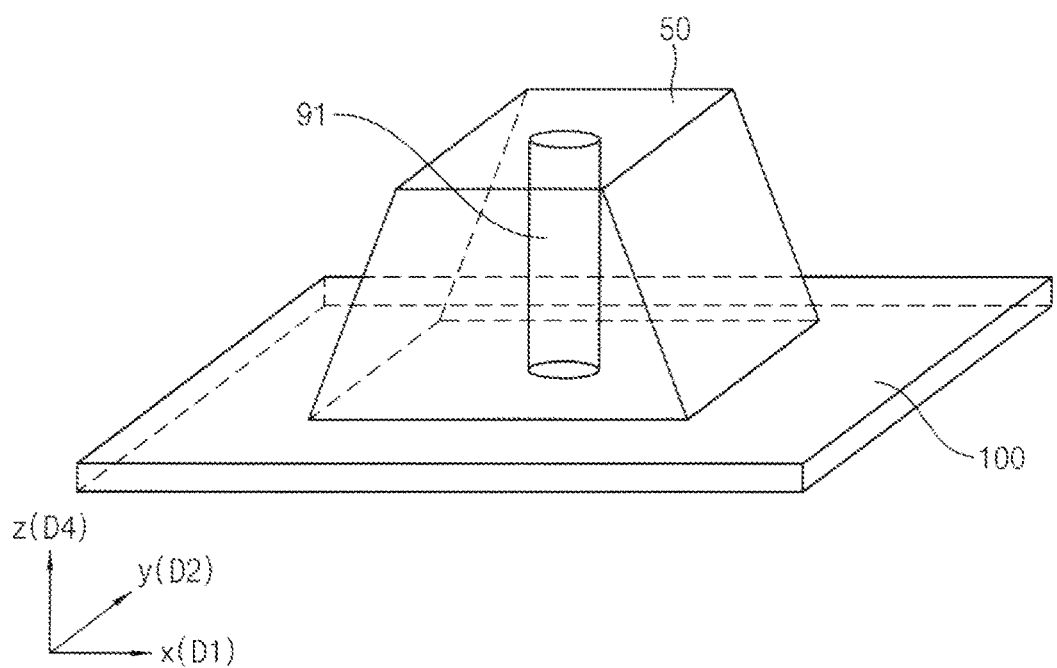
FIG. 2 is an enlarged schematic perspective view of a support part included in the lower plate of FIG. 1.

FIG. 2 is an enlarged perspective view of a support part 50 included in the lower plate 100 of FIG. 1.

Referring to FIG. 2, each of the support parts 50 may protrude from the lower plate 100 in the z-axis D4 perpendicular to the plane. Each of the support parts 50 may have a quadrangular truncated pyramid shape in which the area of a lower surface is greater than the area of an upper surface. However, the shape of each of the support parts 50 is not limited thereto. For example, each of the support parts 50 may have a rectangular parallelepiped shape.

The through hole 91 may be formed in each of the support parts 50. The through hole 91 may have a cylindrical shape. However, the shape of the through hole 91 is not limited thereto. The depth of the through hole 91 may be equal to the height of each of the support parts 50 (e.g., the height of the quadrangular truncated pyramid shape). The through hole 91 may penetrate from the upper surface to the lower surface of each of the support parts 50. The through hole 91 may penetrate each of the support parts 50 and may not penetrate the lower plate 100.

Figure 3:
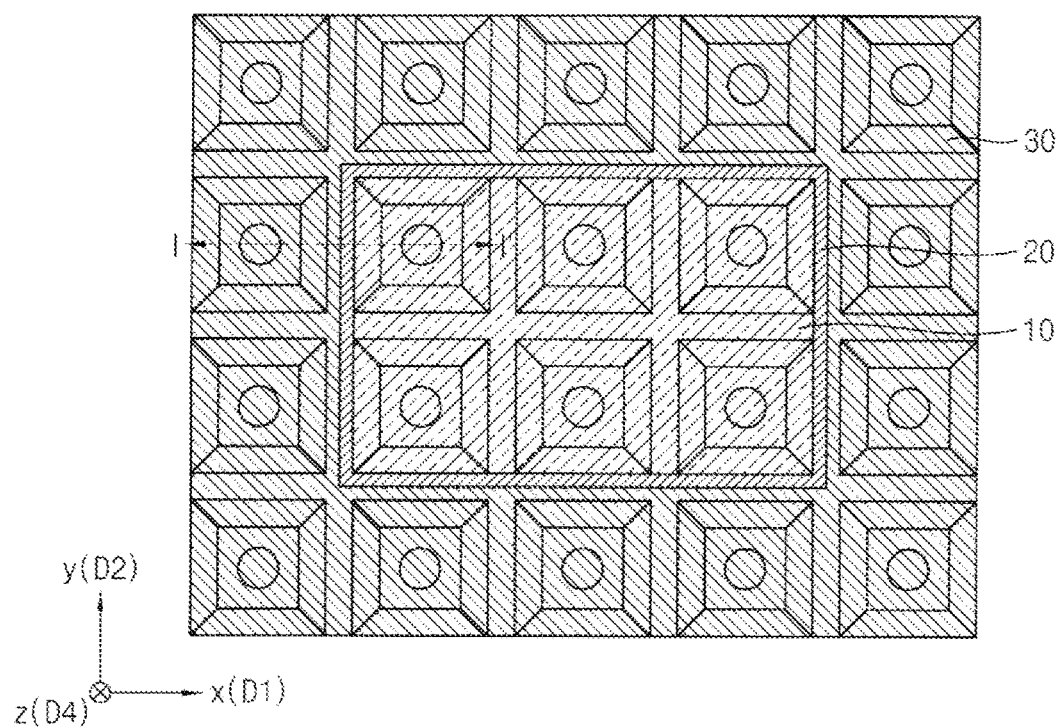
FIG. 3 is a schematic plan view illustrating areas of the lower plate of FIG. 1.

FIG. 3 is a schematic plan view illustrating areas 10, 20, and 30 of the lower plate 100 of FIG. 1.

Referring to FIG. 3, the lower plate 100 may include a first area 10, a second area 20 surrounding the first area 10, and a third area 30 surrounding the second area 20. The first area 10 may include an area in which six adjacent support parts 50 are disposed and a separation area SA between the support parts 50. The second area 20 may be formed outside the first area 10 to surround the first area 10. A width of the second area 20 may be half of a width of the separation area SA. The third area 30 may be an area outside the first area 10 and the second area 20. For example, as illustrated, the second area 20 may have a rectangular shape.

Figure 4:
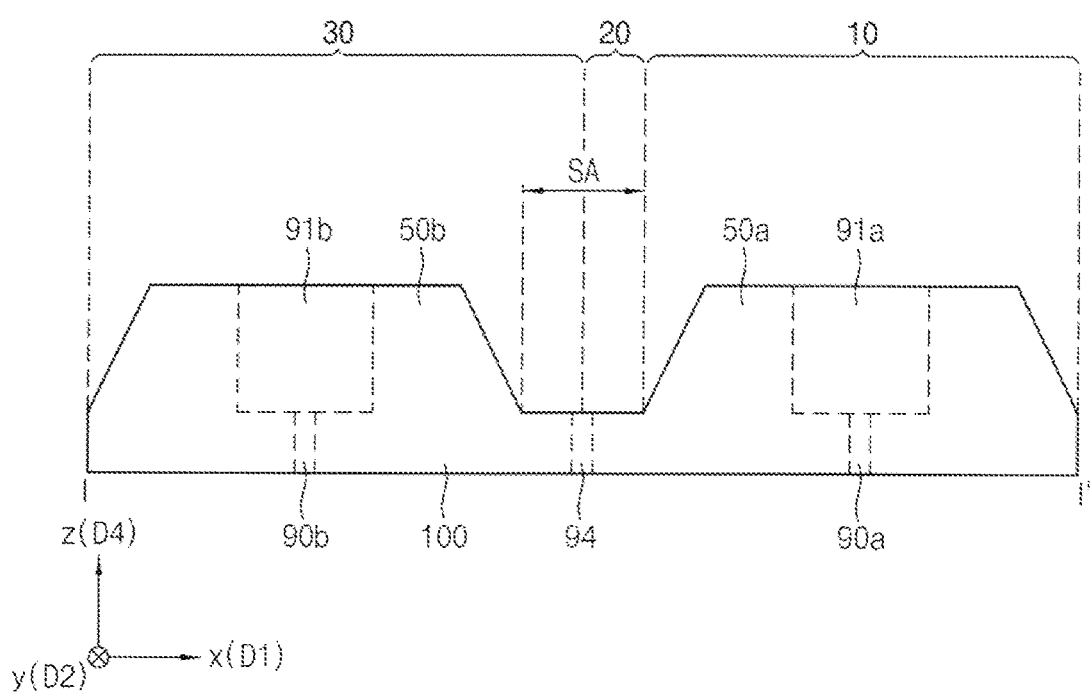
FIGS. 4 and 5 are schematic cross-sectional views taken along line I-I' of FIG. 3.
Figure 5:
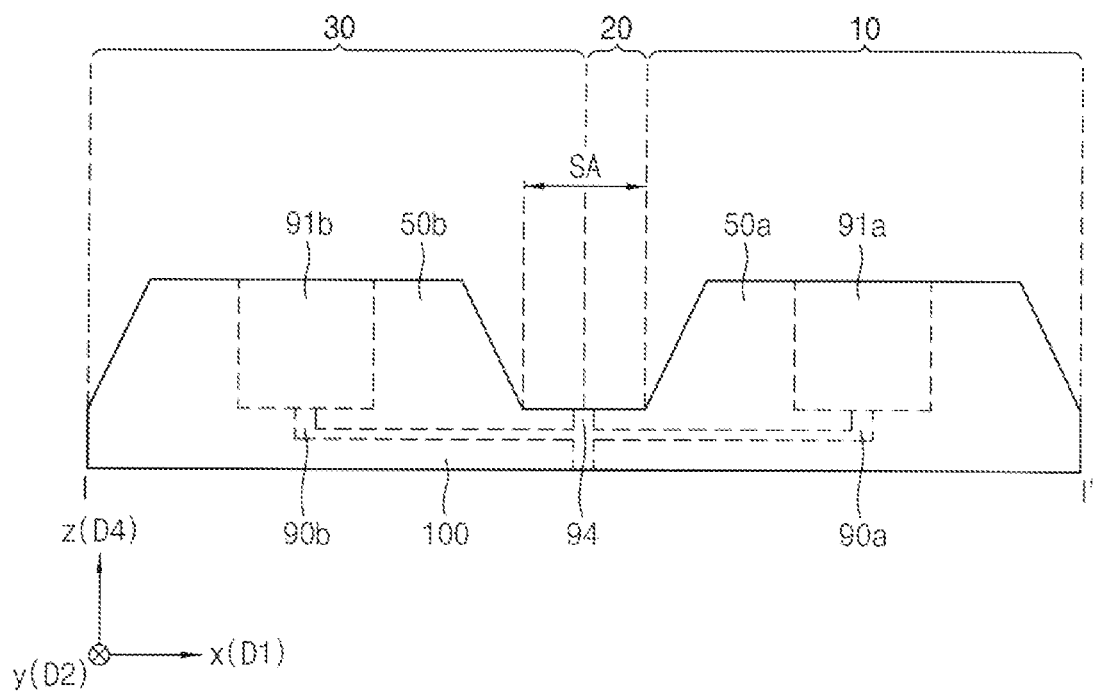

FIGS. 4 and 5 are schematic cross-sectional views taken along line I-I' of FIG. 3.

Referring to FIG. 4, a support part 50a disposed in the first area 10 and a support part 50b disposed in the third area 30 may be spaced apart from each other with the separation area SA therebetween. The separation area SA may include the second area 20. The second area 20 may correspond to a half of the separation area SA. The second area 20 may be adjacent to the support part 50a disposed in the first area 10.

Through holes 91a and 91b may be formed in each of the support part 50a disposed in the first area 10 and the support part 50b disposed in the third area 30. Vacuum passages 90a and 90b may be disposed under and connected to each of the through holes 91a and 91b, and may penetrate the lower plate 100. A vacuum chamber may be disposed outside the lower plate 100 and may be connected to the vacuum passages 90a and 90b. The vacuum chamber may provide a vacuum pressure to the vacuum passages 90a and 90b. Accordingly, the vacuum passages 90a and 90b, and the through holes 91a and 91b connected to the vacuum passages 90a and 90b may have a vacuum state.

In the separation area SA, the lower plate 100 may include a foreign material discharge passage 94 penetrating the lower plate 100 therein. The vacuum chamber may be connected to the foreign material discharge passage 94. The vacuum chamber may provide the vacuum pressure to the foreign material discharge passage 94. The foreign material discharge passage 94 may have a vacuum state. Accordingly, the foreign material discharge passage 94 may suck any foreign material in the separation area SA. The foreign material discharge passage 94 may provide a suction force to the foreign material.

Referring to FIG. 5, the vacuum passages 90a and 90b and the foreign material discharge passage 94 may be connected to each other and may penetrate the lower plate 100. Accordingly, the vacuum chamber may be simultaneously connected to the vacuum passages 90a and 90b and the foreign material discharge passage 94. The vacuum passages 90a and 90b, the through holes 91a and 91b, and the foreign material discharge passage 94 may have a vacuum state at the same time.

Figure 6:
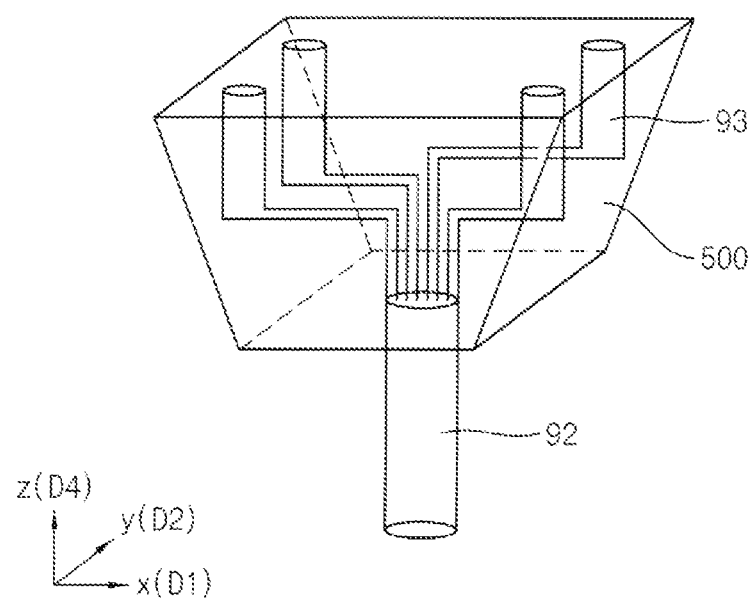
FIG. 6 is an enlarged schematic perspective view of a block included in the worktable for laser processing according to an embodiment.

FIG. 6 is an enlarged schematic perspective view of a block 500 included in the worktable for laser processing according to an embodiment.

Referring to FIG. 6, a block 500 may illustrate an internal blocks 200 to be described below and/or an external blocks 300 to be described below. A suction passage 93 may be formed in the block 500. Four suction passages 93 may be formed in a block 500. However, a number of the suction passage 93 is not limited thereto. For example, multiple suction passages 93 may be formed inside a block 500.

The block 500 may include a coupling portion 92 disposed on a lower surface. The coupling portion 92 may be connected to the suction passage 93. The coupling portion 92 may not be disposed in a center of the lower surface of the block 500. The coupling portion 92 may be freely disposed on the lower surface of the block 500. The coupling portion 92 may have a cylindrical shape. However, the shape of the coupling portion 92 is not limited thereto. The coupling portion 92 may have a same shape as the through hole 91. As the coupling portion 92 and the through hole 91 are coupled (or attached), the block 500 may be coupled (or attached) to the lower plate 100. At least a portion of an inside of the coupling portion 92 may be hollow. The coupling portion 92 may have a hollow cylindrical shape.

The block 500 may have a quadrangular truncated pyramid shape in which an area of an upper surface is larger than an area of the lower surface. A side surface of the block 500 may be inclined so that the area of the upper surface is larger than the area of the lower surface. However, the shape of the block 500 is not limited thereto. For example, the block 500 may have a rectangular parallelepiped shape.

The block 500 may have different sizes depending on whether they are internal blocks 200 or the external blocks 300. The block 500 may have different sizes and shapes depending on whether they are first internal blocks, second internal blocks, or third internal blocks to be described below. The block 500 may have different sizes and shapes depending on whether they are first external blocks or second external blocks to be described below.

Figure 7:
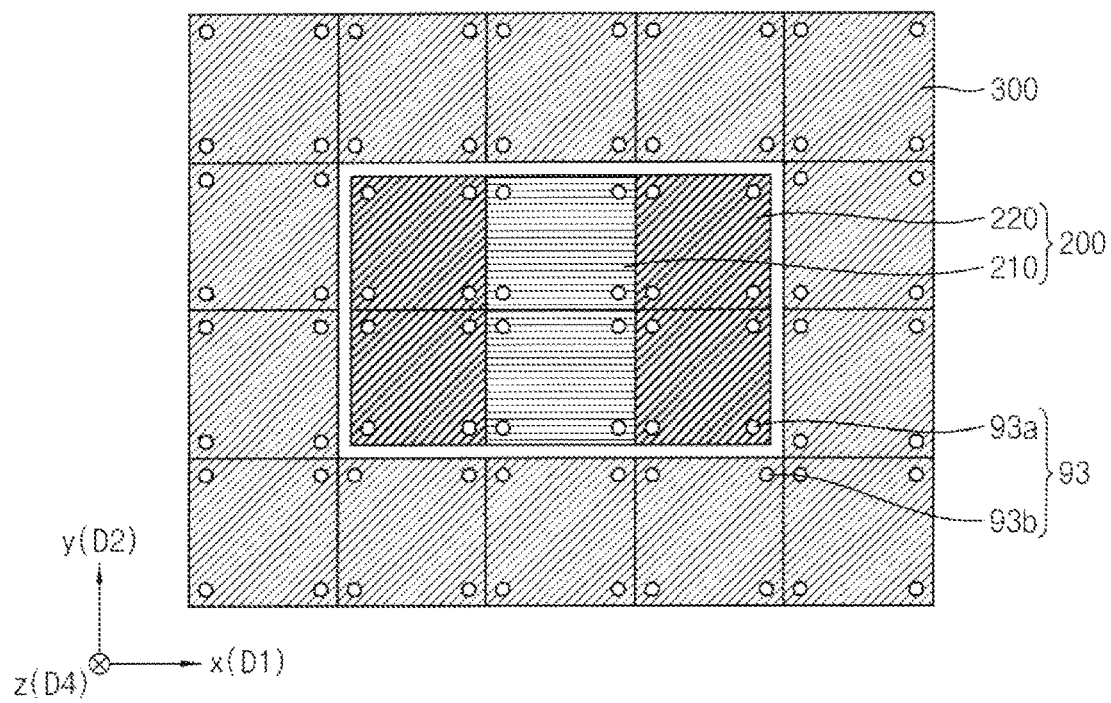
FIG. 7 is a schematic plan view illustrating internal blocks and external blocks included in the worktable for laser processing according to an embodiment.

FIG. 7 is a schematic plan view illustrating internal blocks 200 and external blocks 300 included in the worktable for laser processing according to an embodiment. The lower plate 100 (not shown) is disposed below the internal blocks 200 and external blocks 300.

Referring to FIG. 7, each of the support parts 50 disposed in the first area 10 of the lower plate 100 may be coupled (or attached) to internal blocks 200. In a plan view, the internal blocks 200 may contact each other. The internal blocks 200 may include first internal blocks 210 and second internal blocks 220. The first internal blocks 210 and the second internal blocks 220 may have different sizes and shapes depending on the degree to which they overlap the separation area SA of the lower plate 100.

Each of the support parts 50 disposed in the third area 30 of the lower plate 100 may be coupled (or attached) to external blocks 300. In a plan view, the external blocks 300 may contact each other. The gap where the internal blocks 200 and the external blocks 300 are spaced apart from each other and do not contact each other may correspond to the second area 20 of the lower plate 100.

The internal blocks 200 may be coupled (or attached) to the support parts 50, and the external blocks 300 may be coupled (or attached) to the support parts 50 by coupling (or attaching) the coupling portions 92 of the internal blocks 200 or the external blocks 300 to the through holes 91 of the support parts 50.

The suction passages 93 may be formed on the upper surface of the internal blocks 200 and the upper surface of the external blocks 300. The suction passage 93a of the internal blocks 200 may fix an effective cell portion of a workpiece. The suction passage 93a of the internal blocks 200 may be defined as an effective cell suction passage. The suction passage 93b of the external blocks 300 may fix a dummy portion of the workpiece. The suction passage 93b of the external blocks 300 may be defined as a dummy suction passage.

Figure 8:
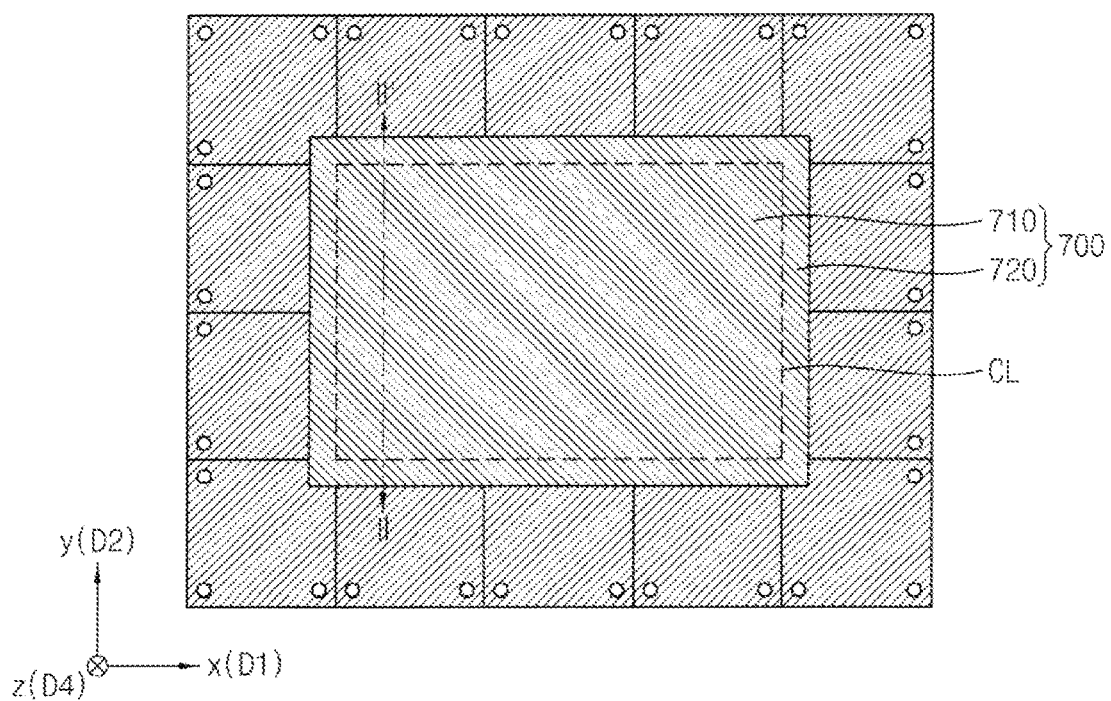
FIG. 8 is a schematic plan view illustrating a workpiece disposed on the worktable for laser processing according to an embodiment.

FIG. 8 is a schematic plan view illustrating a workpiece 700 disposed on the worktable for laser processing according to an embodiment.

Referring to FIG. 8, the workpiece 700 may be disposed on the internal blocks 200 and the external blocks 300. The workpiece 700 may have a first polygonal shape including a side parallel to the x-axis D1 and a side parallel to the y-axis D2. The workpiece 700 may have a rectangular shape.

The workpiece 700 may be cut by irradiating a laser beam. When the laser beam is irradiated, the workpiece 700 may be cut along a cutting line CL to be separated into an effective cell portion 710 and a dummy portion 720. The effective cell portion 710 may be a central portion of the cutting line CL. The dummy portion 720 may be a portion surrounding the effective cell portion 710.

Referring to FIGS. 7 and 8, the effective cell suction passage 93a may fix the effective cell portion 710 of the workpiece 700. The dummy suction passage 93b may fix the dummy portion 720 of the workpiece 700. The effective cell suction passage 93a and the dummy suction passage 93b may fix the workpiece 700 when the laser beam is irradiated. The vacuum passages 90a and 90b, the through holes 91a and 91b, the coupling portion 92, and the suction passage 93 may receive the vacuum pressure from the vacuum chamber to provide the suction force to the workpiece 700.

Figure 9:
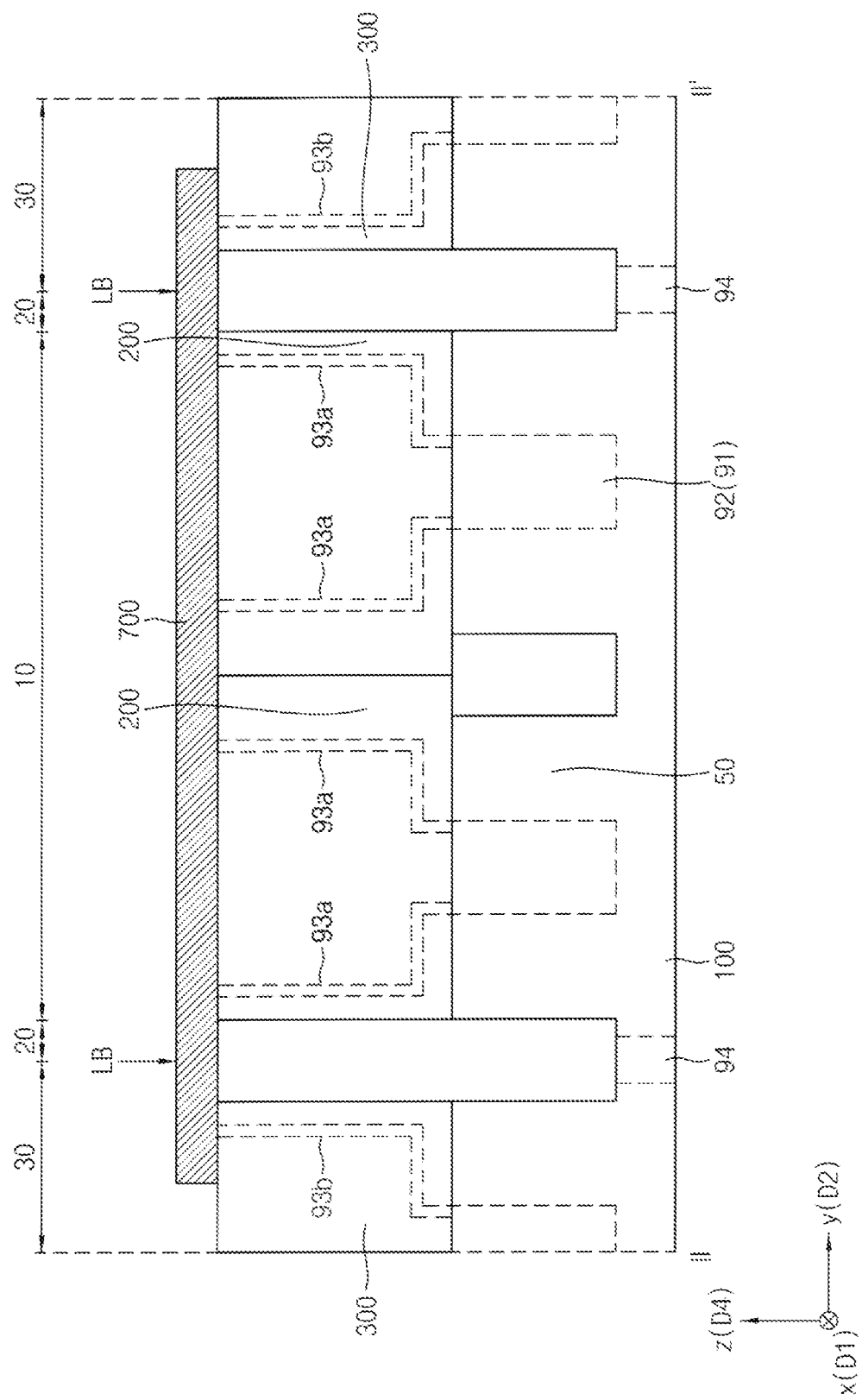
FIGS. 9 and 10 are schematic cross-sectional views illustrating an example of laser processing of the workpiece in FIG. 8.
Figure 10:
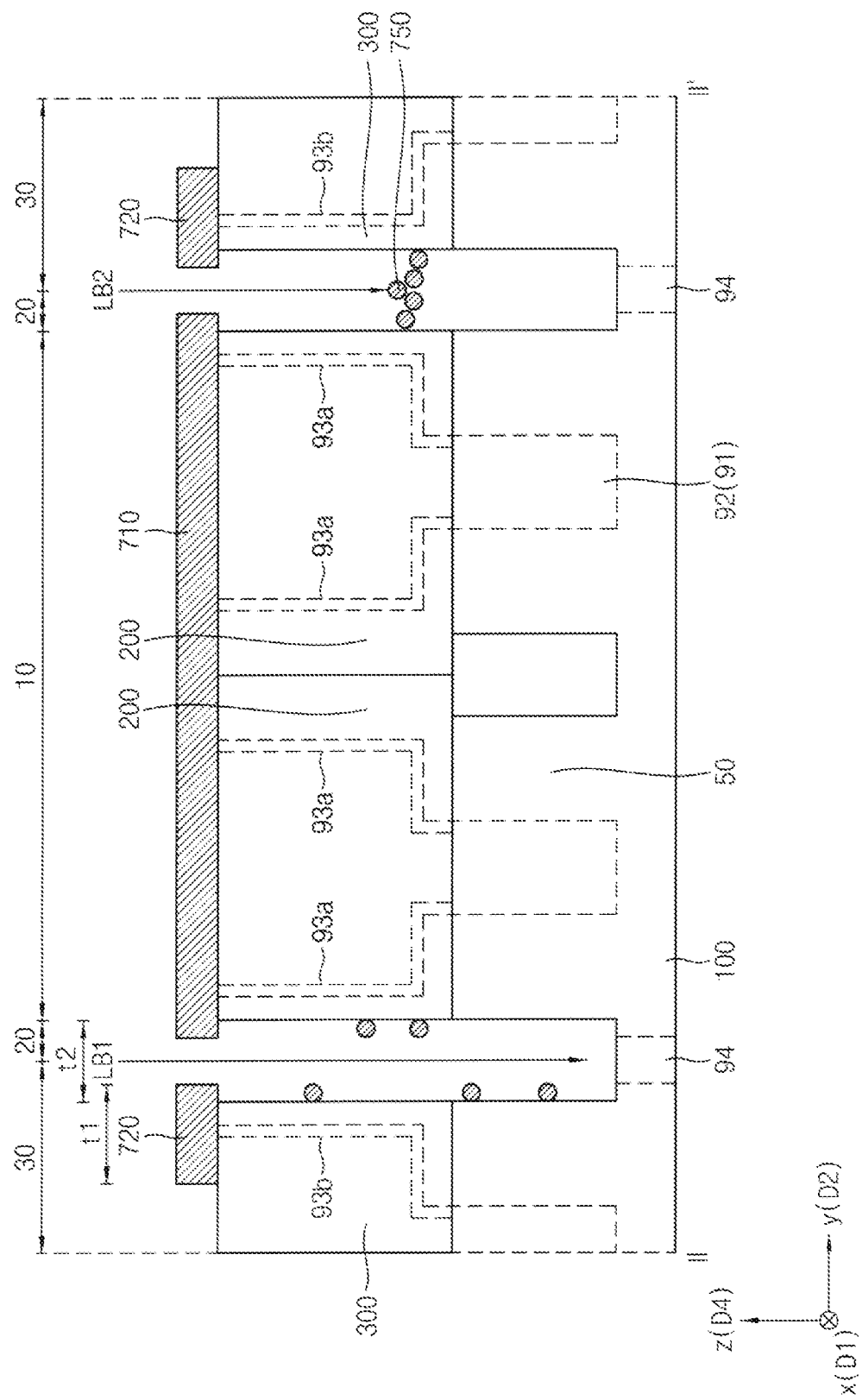

FIGS. 9 and 10 are schematic cross-sectional views illustrating an example of laser processing the workpiece 700 of FIG. 8.

Referring to FIG. 9, FIG. 9 illustrates a schematic cross-sectional view along line II-II' of FIG. 8 before the laser beam is irradiated. The workpiece 700 may overlap the first area 10, the second area 20, and the third area 30. The workpiece 700 may be disposed on the internal blocks 200 and the external blocks 300. The workpiece 700 may be disposed such that a preset cutting line CL overlaps the second area 20.

The suction passages 93a formed inside the internal blocks 200 and the suction passages 93b inside the external blocks 300 may provide the suction force so that the workpiece 700 is fixed. A laser scanner disposed on the worktable for laser processing may laser-process the workpiece 700 by irradiating the laser beam LB.

Referring to FIG. 10, FIG. 10 illustrates a schematic cross-section cut along line II-II' of FIG. 8 after the laser beam is irradiated may be illustrated. The laser beams LB1 and LB2 may be irradiated along the cutting line CL. The workpiece 700 may be divided into the effective cell portion 710 and the dummy portion 720. The effective cell suction passage 93a for fixing the effective cell portion 710 may be formed inside the internal blocks 200. The dummy suction passage 93b for fixing the dummy portion 720 may be formed inside the external blocks 300.

When a length t1 of the dummy portion 720 is smaller than an interval t2 between each of the internal blocks 200 and each of the external blocks 300, the dummy portion 720 may fall between each of the internal blocks 200 and each of the external blocks 300. Accordingly, the length t1 of the dummy portion 720 may be greater than the interval t2 between each of the internal blocks 200 and each of the external blocks 300.

Since the dummy portion 720 is a portion that is substantially discarded, as the length t1 of the dummy portion 720 increases, material waste may increase. Accordingly, a method for minimizing the dummy portion 720 is being sought. However, as described above, since the length t1 of the dummy portion 720 must be greater than the interval t2 between the each of internal blocks 200 and each of the external blocks 300, in order to reduce the length t1 of the dummy portion 720, it may be required to reduce the interval (or gap) t2 between each of the internal blocks 200 and each of the external blocks 300.

When the laser beams LB1 and LB2 are irradiated, a foreign material 750 of the workpiece 700 may be generated. The foreign material 750 may be a carbonized foreign material. The size of the illustrated foreign material 750 is exaggerated in the drawings.

The foreign material 750 may fall into the separation area SA in which the support parts 50 are spaced apart along a space between each of the internal blocks 200 and each of the external blocks 300. The foreign material 750 may not fall on the support parts 50, but may fall into the separation area SA between the support parts 50. The foreign material 750 falling into the separation area SA may escape to the outside of the lower plate 100 by the suction force through the foreign material discharge passage 94 formed in the lower plate 100.

The foreign material 750 may stick to the side surfaces of the internal blocks 200, the side surfaces of the external blocks 300, or the side surfaces of the support parts 50. The foreign material 750 may accumulate in the separation area SA without escaping to the outside of the lower plate 100 even if the suction force is applied through the foreign material discharge passage 94. As the interval (or gap) t2 between the internal blocks 200 and the external blocks 300 becomes narrower, the possibility that the foreign material 750 sticks to the side surfaces of the internal blocks 200, the external blocks 300, or the support parts 50 may increase. The embodiments, described below, may reduce the probability that foreign material 750 that sticks to the surfaces while minimizing the interval t2 between the internal blocks 200 and the external blocks 300.

Figure 11:
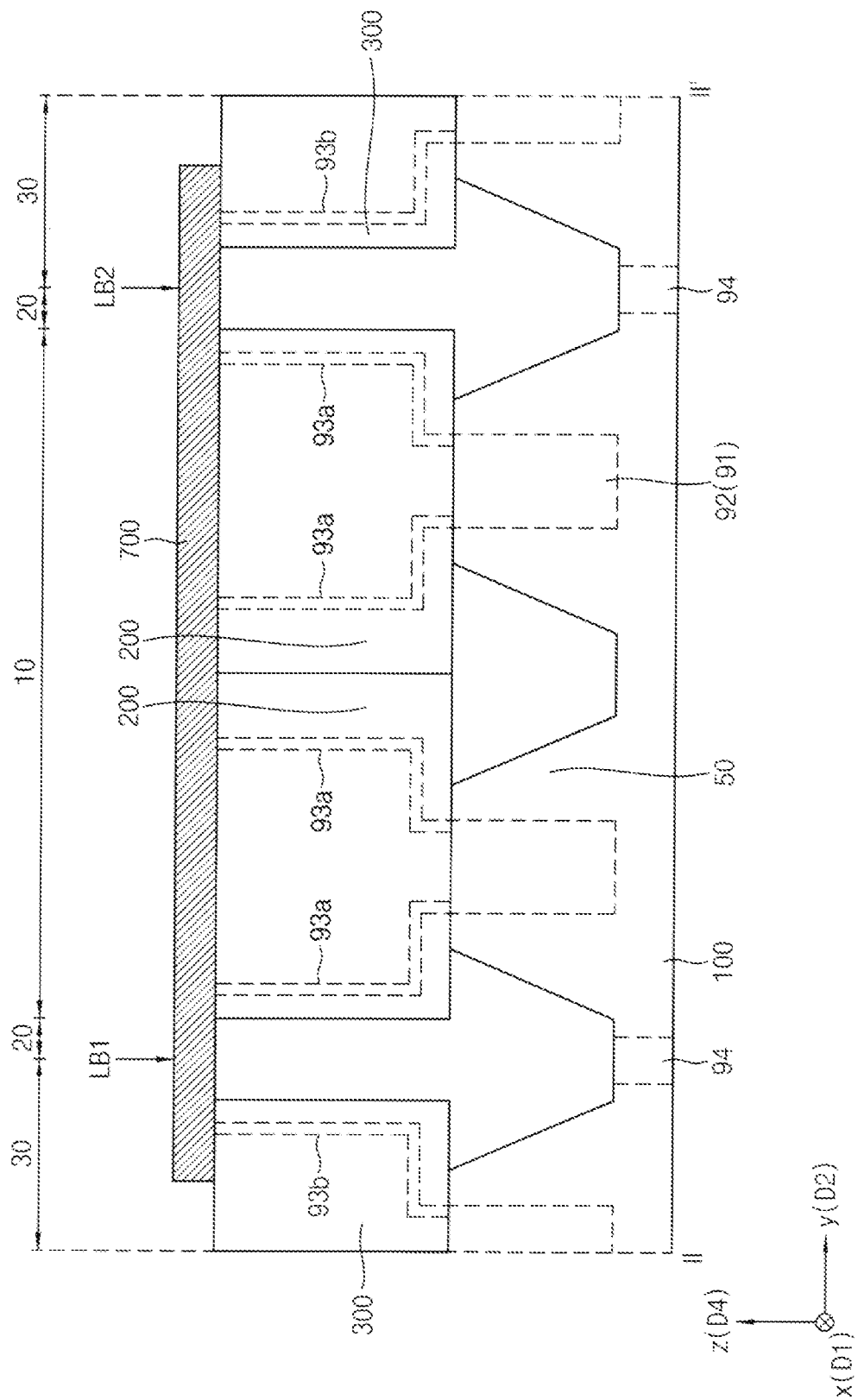
FIGS. 11 and 12 are schematic cross-sectional views illustrating an example of laser processing of the workpiece in FIG. 8.
Figure 12:
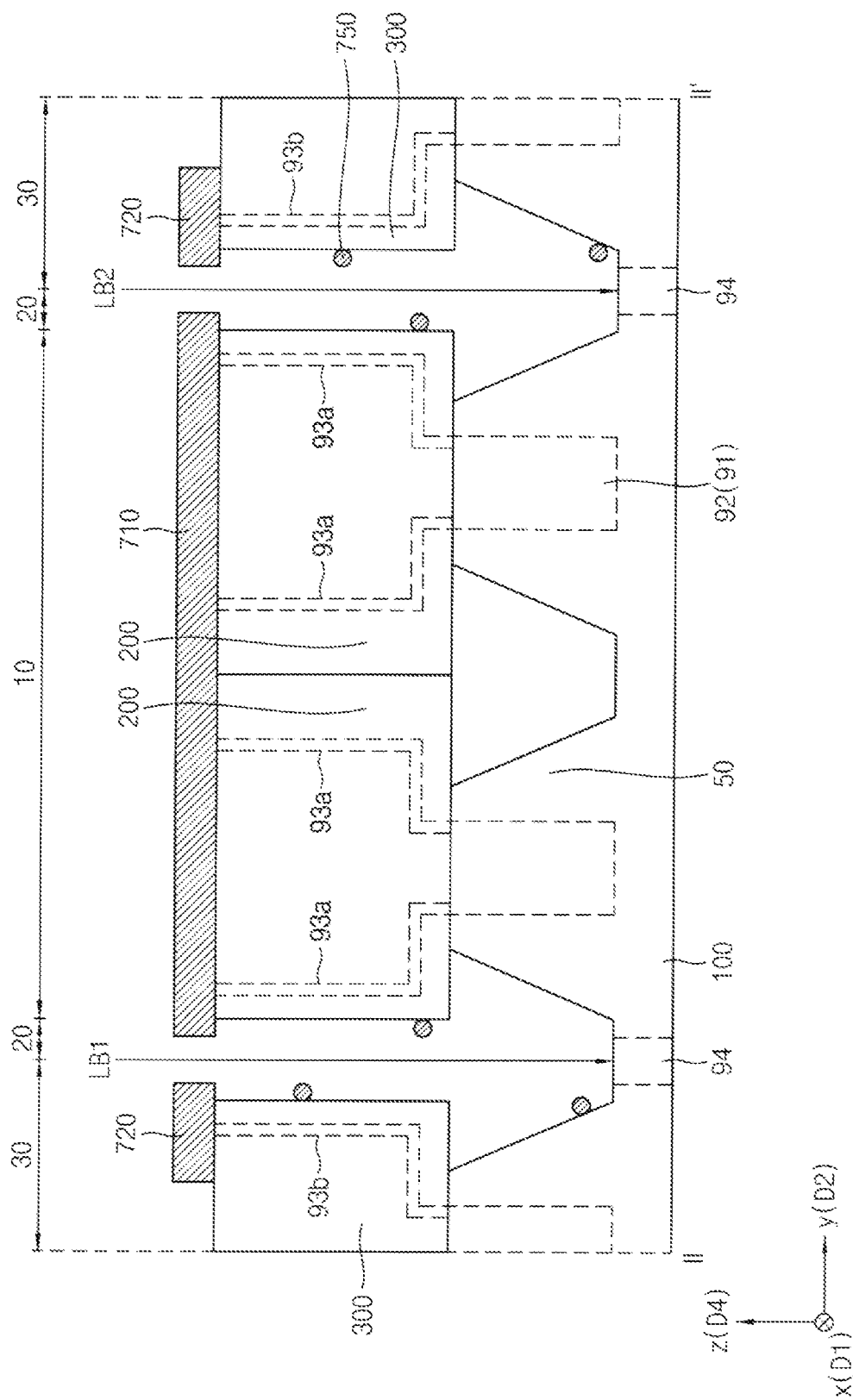

FIGS. 11 and 12 are schematic cross-sectional views illustrating an example of laser processing the workpiece 700 of FIG. 8.

Referring to FIGS. 11 and 12, a side surface of each of the support parts 50 may be inclined. Each of the support parts 50 may have a quadrangular truncated pyramid shape. The possibility that the foreign material 750 is adsorbed to the side surface of the support parts 50 may be reduced. The foreign material 750 may be easily discharged.

Figure 13:
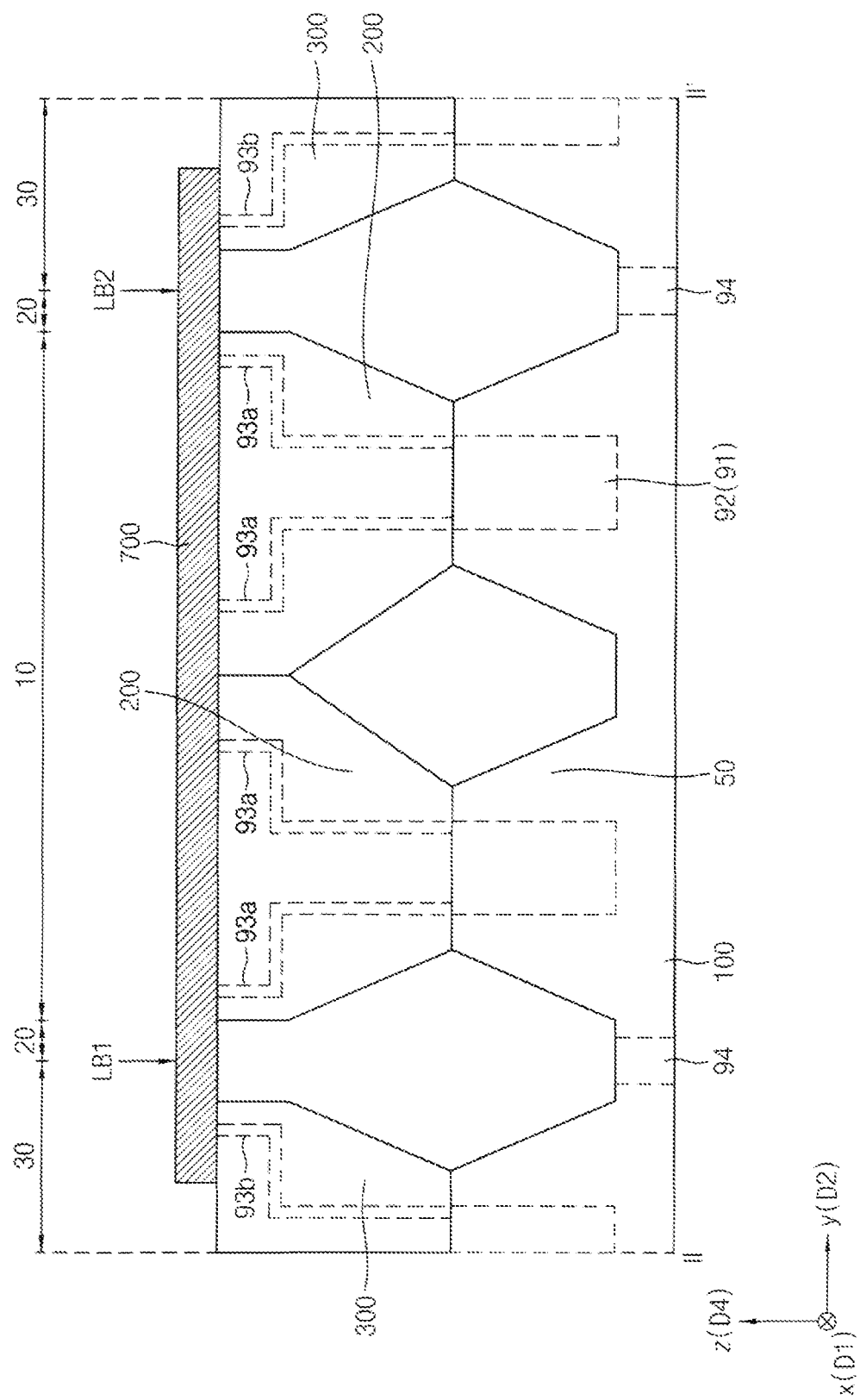
FIGS. 13 and 14 are schematic cross-sectional views illustrating an example of laser processing of the workpiece in FIG. 8.
Figure 14:
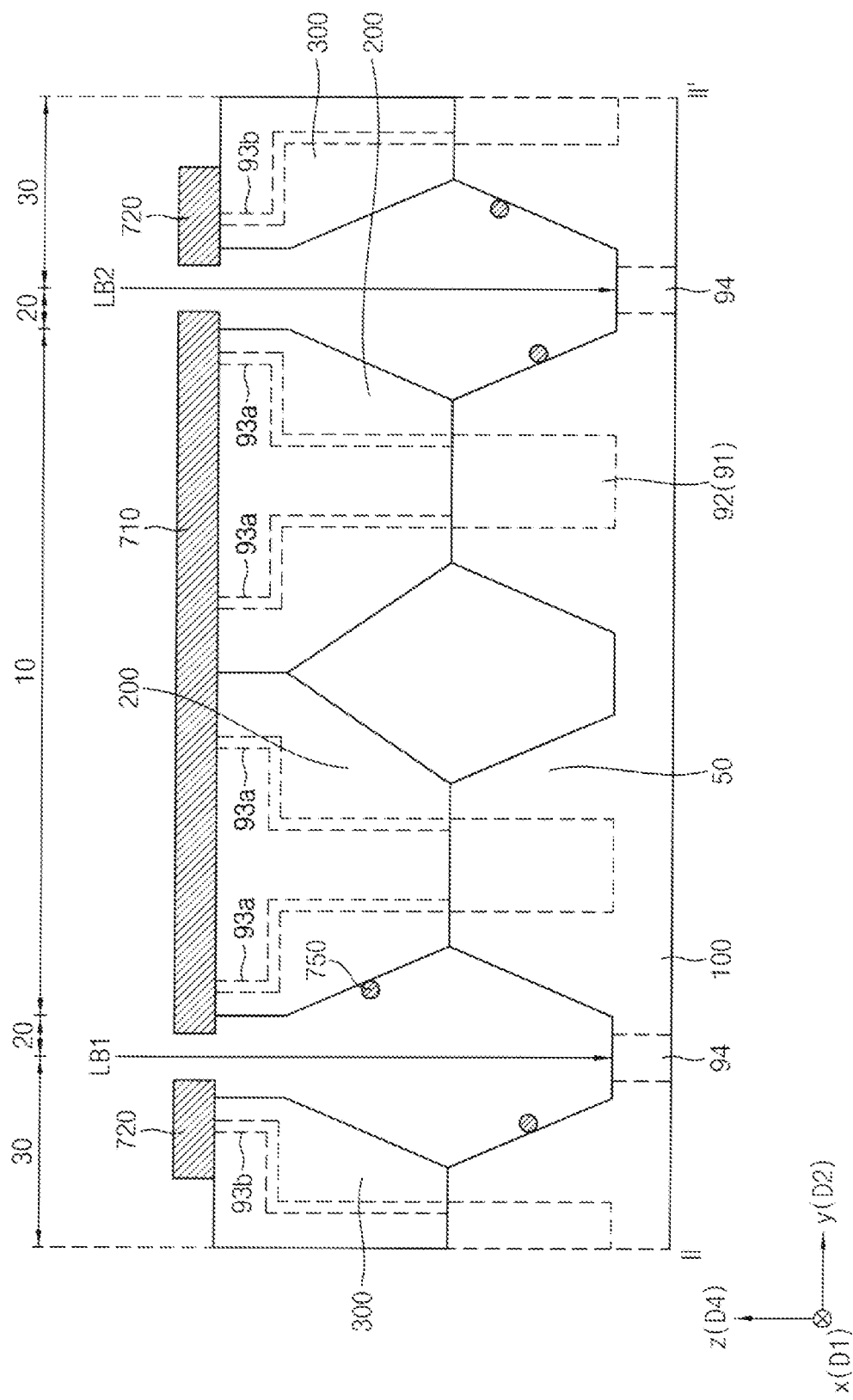

FIGS. 13 and 14 are schematic cross-sectional views illustrating an example of laser processing the workpiece 700 of FIG. 8.

Referring to FIGS. 13 and 14, the side surface of each of the support parts 50 may be inclined. Each of the support parts 50 may have a quadrangular truncated pyramid shape. A portion of side surfaces of each of the internal blocks 200 and each of the external blocks 300 may also be inclined. The foreign material 750 may be more easily discharged.

Figure 15:
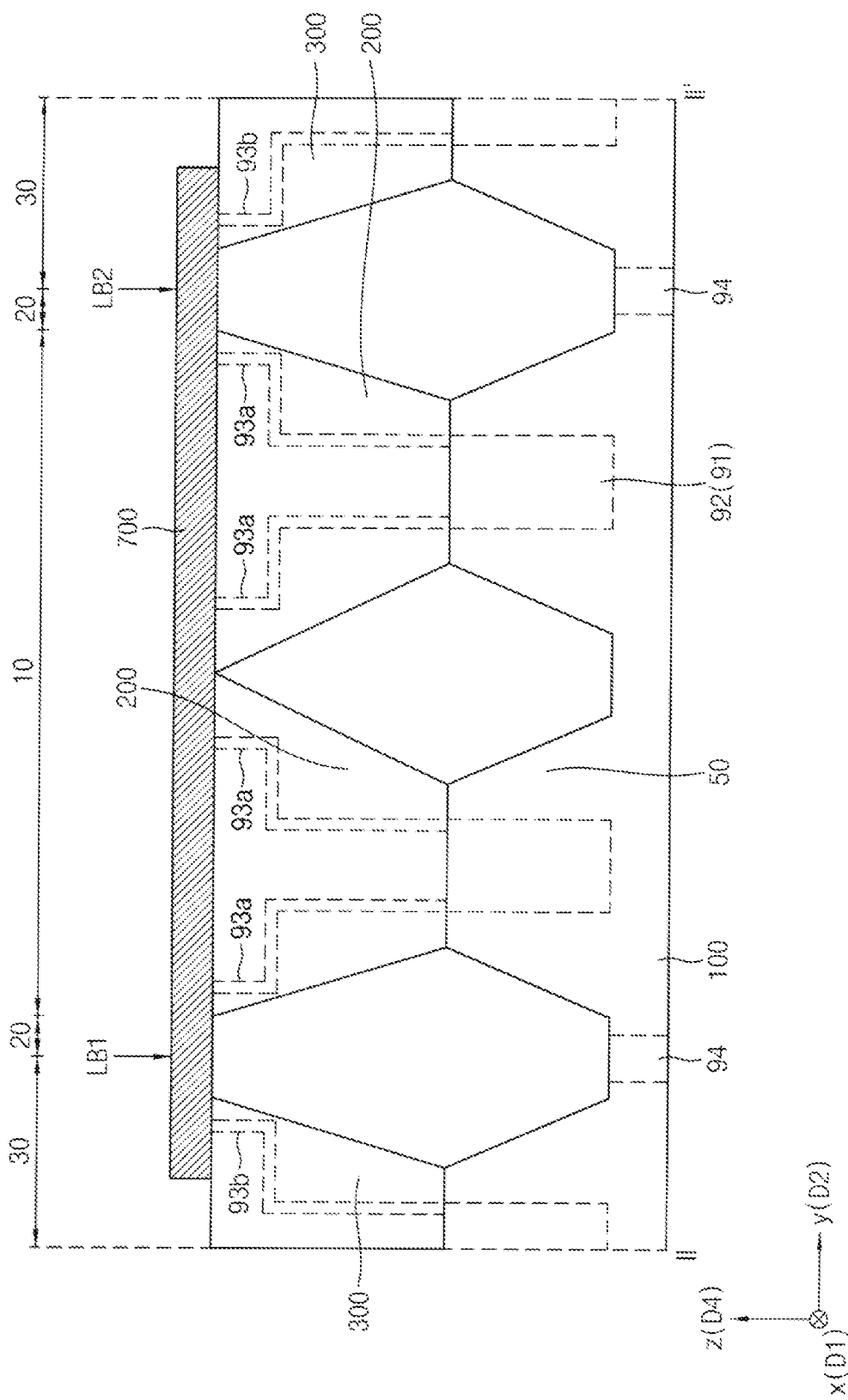
FIGS. 15 and 16 are schematic cross-sectional views illustrating an example of laser processing of the workpiece in FIG. 8.
Figure 16:
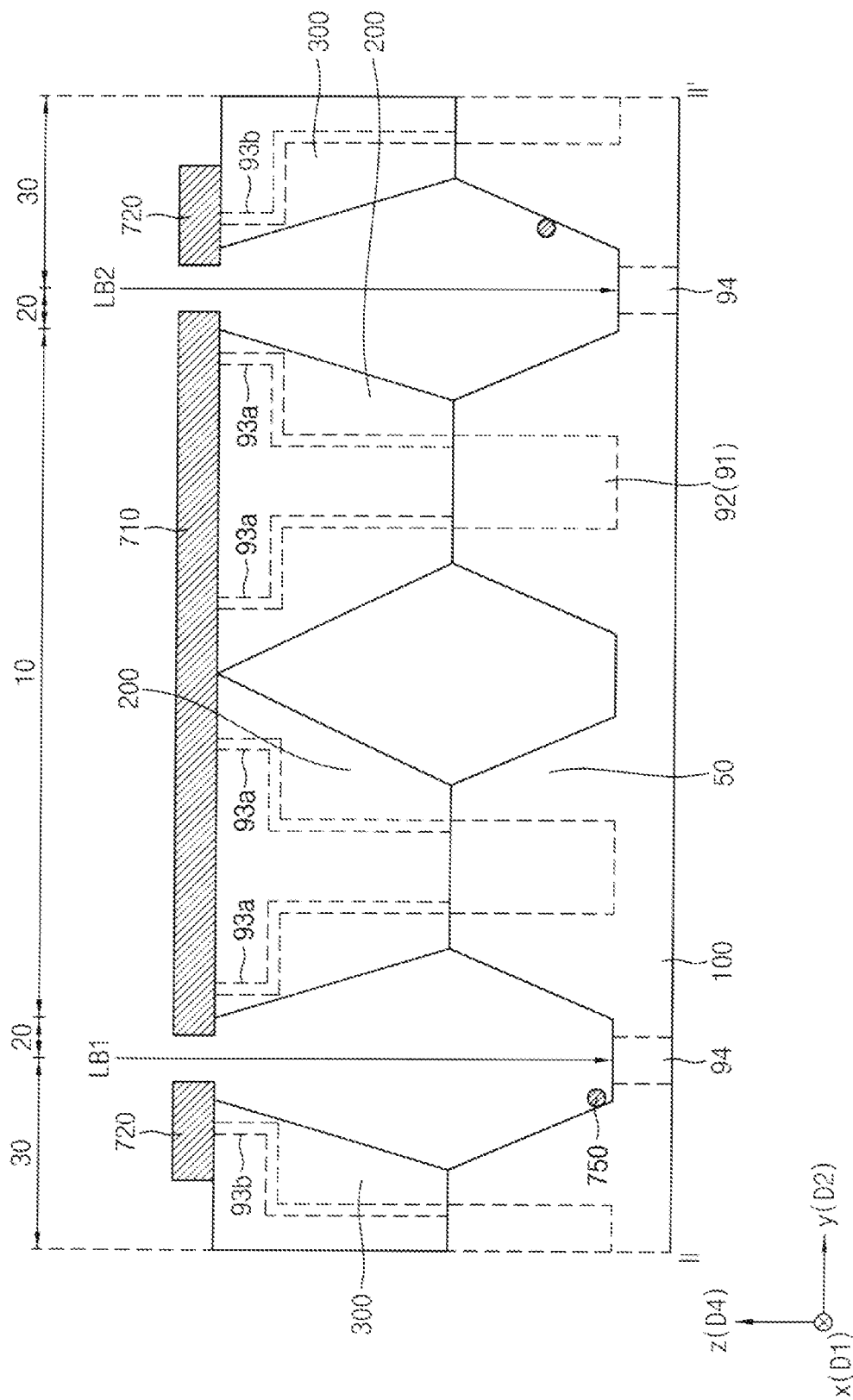

FIGS. 15 and 16 are schematic cross-sectional views illustrating another example of laser processing the workpiece 700 of FIG. 8.

Referring to FIGS. 15 and 16, the side surface of each of the support parts 50 may be inclined. Each of the support parts 50 may have a quadrangular truncated pyramid shape. The side surfaces of each of the internal blocks 200 and each of the external blocks 300 may also be inclined. The foreign material 750 may be more easily discharged.

Referring to FIGS. 11 to 16, since the side surface of each of the internal blocks 200, the side surface of each of the external blocks 300, and the side surface of the support parts 50 be inclined, the foreign material 750 may not stick to the inclined side surfaces and may more easily escape through the foreign material discharge passage 94. The possibility that the foreign material 750 sticks may be reduced. The interval t2 between each of the internal blocks 200 and each of the external blocks 300 may be minimized. By reducing the length t1 of the dummy portion 750, the material waste may be minimized.

In the embodiments, the shape of the workpiece may be changed (for example, the cutting line may be changed), without replacing entire worktable. Avoiding replacement of the entire worktable when processing a workpiece with a different shape reduces the time for replacement and reduces costs involved in preparing and storing extra worktables.

Figure 17:
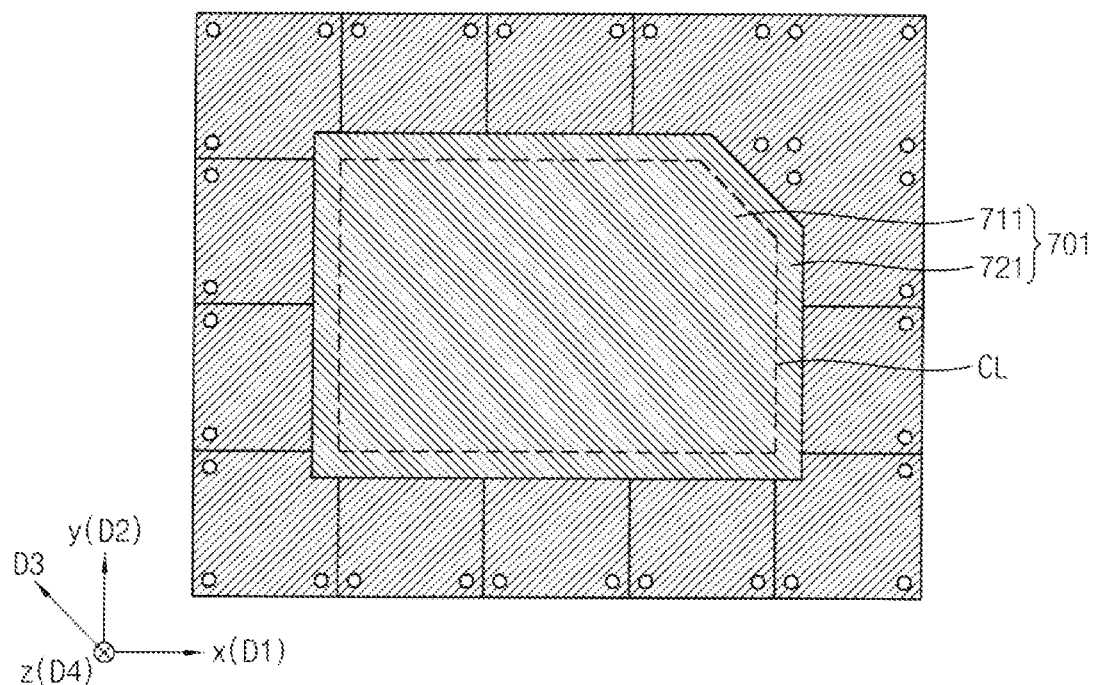
FIG. 17 is a schematic plan view illustrating a workpiece disposed on the worktable for laser processing according to an embodiment.
Figure 18:
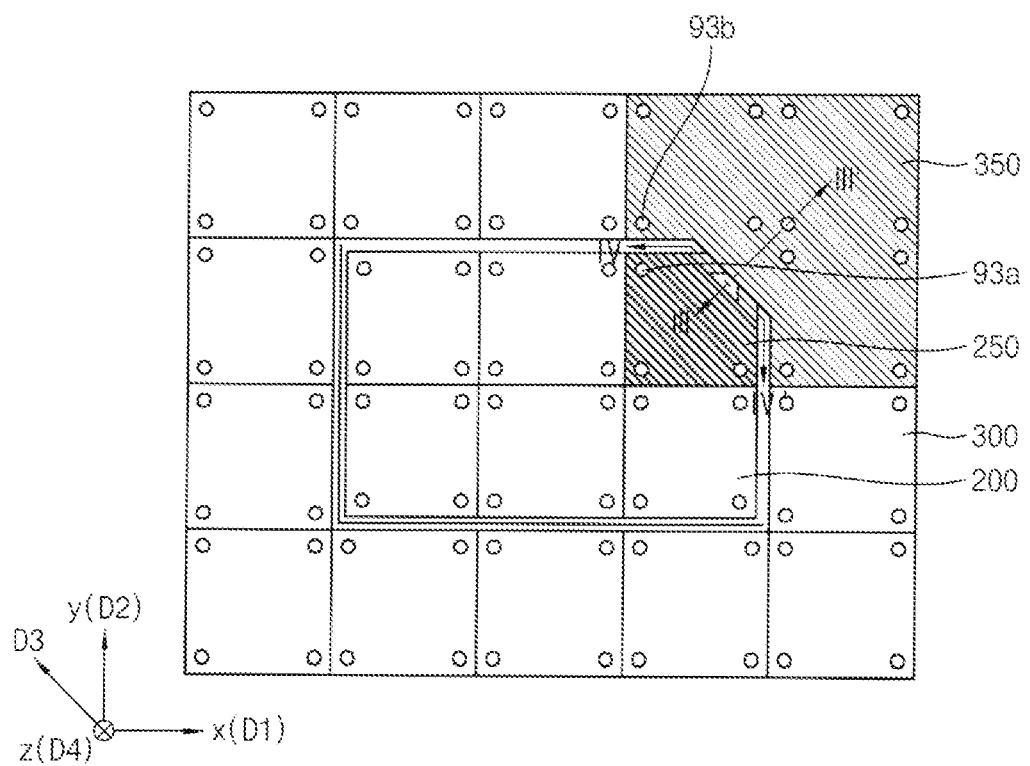
FIG. 18 is a schematic plan view illustrating internal blocks and external blocks included in the worktable for laser processing of FIG. 17.

FIG. 17 is a schematic plan view illustrating a workpiece 700 disposed on the worktable for laser processing according to another embodiment. FIG. 18 is a schematic plan view illustrating internal blocks 200 and external blocks 300 included in the worktable for laser processing of FIG. 17.

Referring to FIG. 17, a third direction D3 may cross the x-axis D1 and the y-axis D2. A workpiece 701 may include a side parallel to the x-axis D1, a side parallel to the y-axis D2, and a side not parallel to the x-axis D1 and the y-axis D2. The side not parallel to the x-axis D1 and the y-axis D2 may be the side parallel to the third direction D3. The workpiece 701 may include the side parallel to the x-axis D1, the side parallel to the y-axis D2, and the side parallel to the third direction D3. The workpiece 701 may have a second polygonal shape (for example, a pentagonal shape). The workpiece 701 having the second polygonal shape may include an effective cell portion 711 and a dummy portion 721. A cutting line CL may be defined along a boundary between the effective cell portion 711 and the dummy portion 721. The workpiece 701 may be disposed on the internal blocks 200 and the external blocks 300.

Referring to FIG. 18, compared with FIGS. 7 and 8, the internal blocks 200 and the external blocks 300 disposed under the workpiece 701 may be replaced. The lower plate 100 (not shown) disposed under the internal blocks 200 and the external blocks 300 may not be replaced.

An internal block 200 adjacent to the side of the workpiece 701 that is parallel to the third direction D3 200 may be replaced with a third internal block 250. The third internal block 250 may have a shape including a side parallel to the third direction D3. An external block 300 adjacent to the side of the workpiece 701 that is parallel to the third direction D3 of the workpiece 701 may be replaced with a second external block 350. The second external block 250 may have a shape including a side parallel to the third direction D3.

Figure 19:
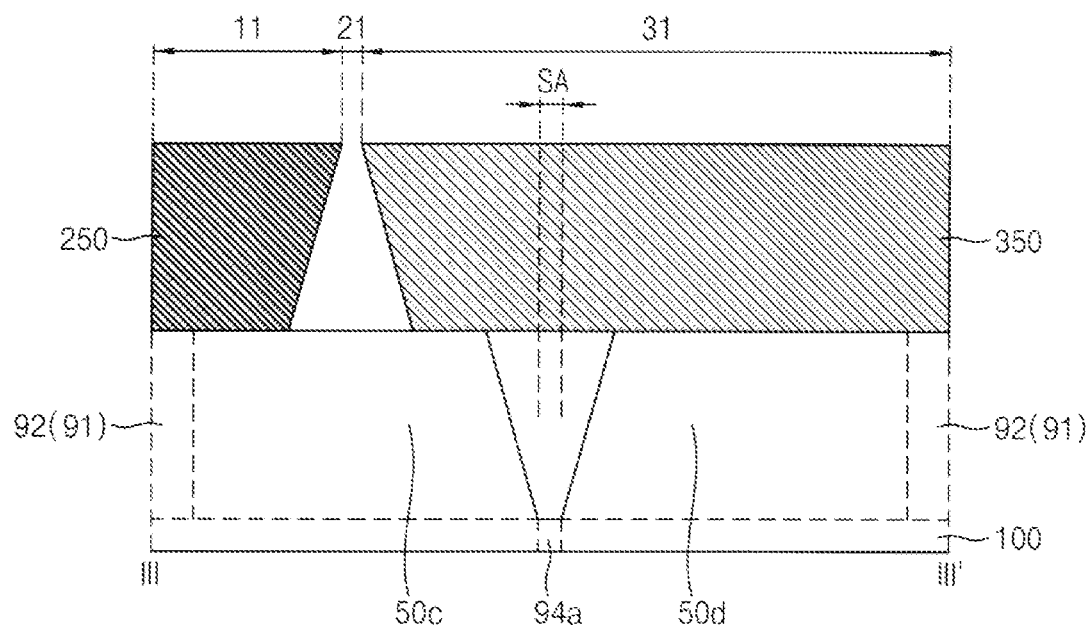
FIG. 19 is a schematic cross-sectional view taken along line III-III' of FIG. 18.

FIG. 19 is a schematic cross-sectional view taken along line III-III' of FIG. 18.

Referring to FIGS. 18 and 19, the lower plate 100 may include a first area 11, a second area 21 surrounding the first area 11, and a third area 31 surrounding the second area 21. The internal blocks 200 may be disposed in the first area 11. The external blocks 300 may be disposed in the third area 31. The second area 21 may be an area between the first area 11 and the third area 31. The lower plate 100 may be newly divided into the first area 11, the second area 21, and the third area 31 when the workpiece 701 having the second polygonal shape is laser processed.

The internal blocks 200 may be replaced so that the outline shape of the first internal blocks 210, the second internal blocks 220, and the third internal block 250 corresponds to the first area 11. The external blocks 300 may be replaced so that the outline shape of the first external blocks 300 and the second external block 350 corresponds to the third area 31.

Referring to FIG. 19, the lower plate 100 may include support parts 50c and 50d that are spaced apart from each other in the separation area SA. The through hole 91 may be formed in each of the support parts 50c and 50d. Each of the third internal block 250 and the second external block 350 may be coupled (or attached) to the lower plate 100 by coupling the coupling portion 92 and the through hole 91. The lower plate 100 may be newly divided into the first area 11 in which the third internal block 250 is disposed, the third area 31 in which the second external block 350 is disposed, and the second area 21 between the first area 11 and the third area 31. The third internal block 250 and the second external block 350 may be spaced apart from each other with the second area 21 interposed therebetween. The workpiece 701 having the second polygonal shape may be disposed on the third internal block 250 and the second external block 350. When the workpiece 701 is irradiated with the laser beam along the cutting line CL, a foreign material 751 may be generated between the third internal block 250 and the second external block 350.

Figure 20:
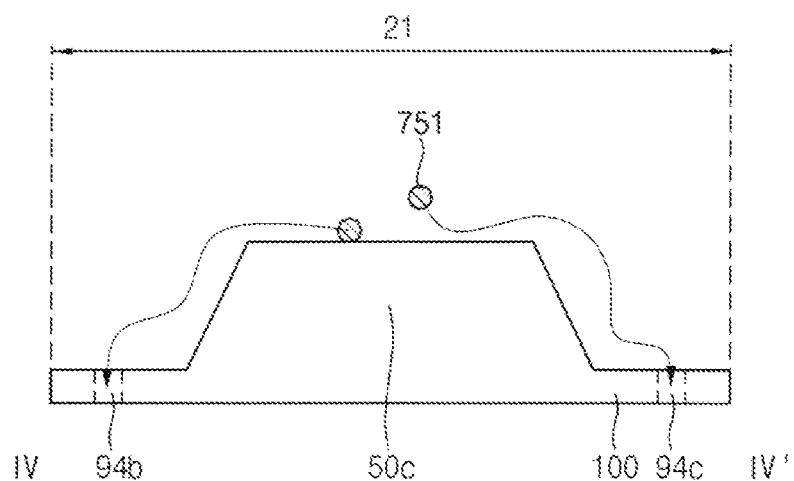
FIG. 20 is a schematic cross-sectional view taken along line IV-IV' of FIG. 18.

FIG. 20 is a schematic cross-sectional view taken along line IV-IV' of FIG. 18.

Referring to FIG. 20, the foreign material 751 generated between the third internal block 250 and the second external block 350 may be disposed on the support part 50c. The foreign material discharge passages 94b and 94c connected to the vacuum chamber outside the lower plate 100 may receive the vacuum pressure to provide the suction force for sucking the foreign material 751. Even if the foreign material 751 is not generated between the support parts 50c and 50d and is generated on the support part 50c, the foreign material 751 may be removed to the outside of the lower plate 100 through the foreign material discharge passages 94b and 94c. Even if the foreign material 751 is not generated on the foreign material discharge passage 94a overlapping the separation area SA, the foreign material 751 may be removed by other foreign material discharge passages 94b and 94c spaced apart from each other.

Since the laser beam is irradiated perpendicularly to the workpiece, the flatness of the worktable for laser processing is important.

Figure 21:
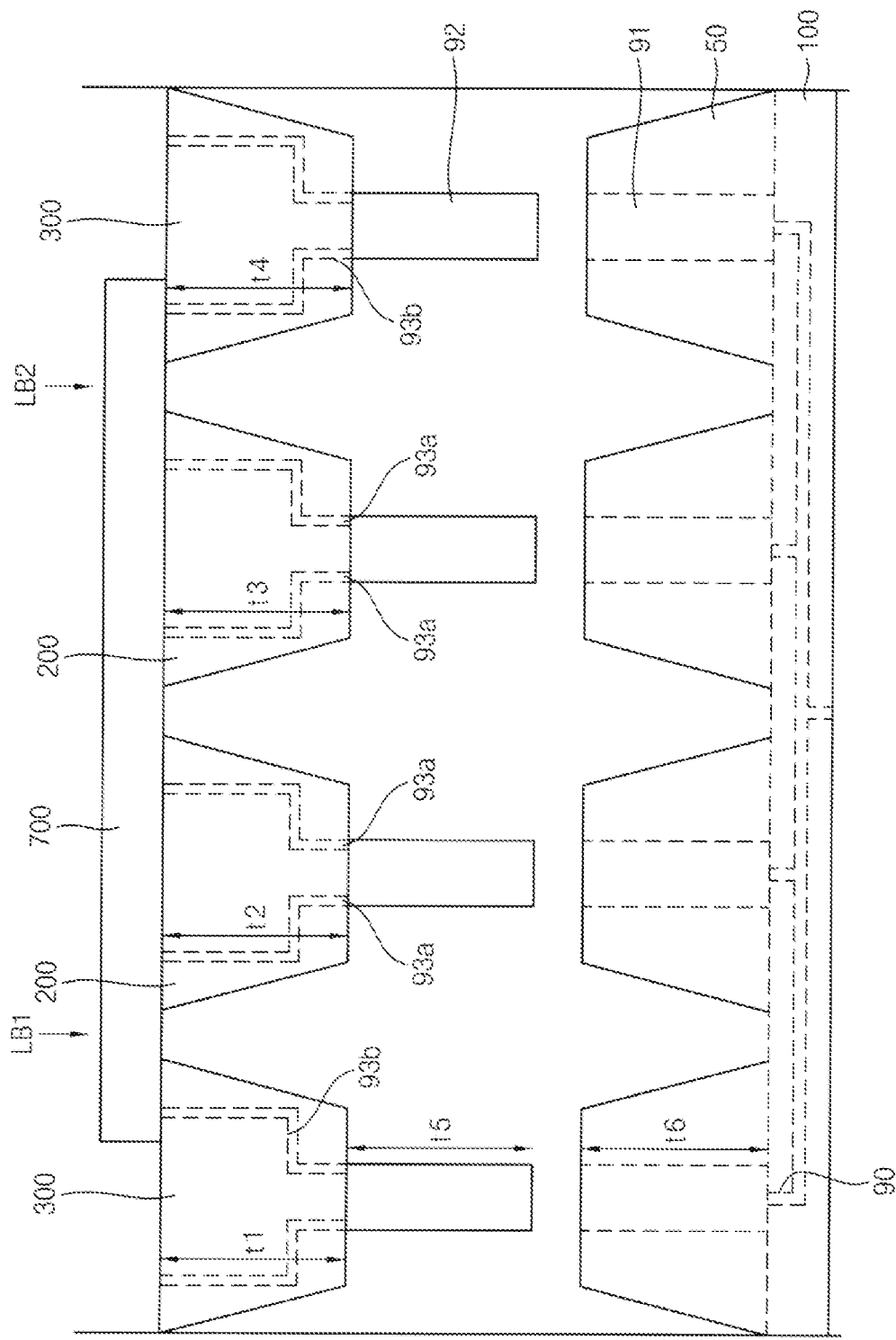
FIG. 21 is a schematic cross-sectional view illustrating the lower plate before it attached to the internal blocks and the external blocks of FIG. 18.
Figure 22:
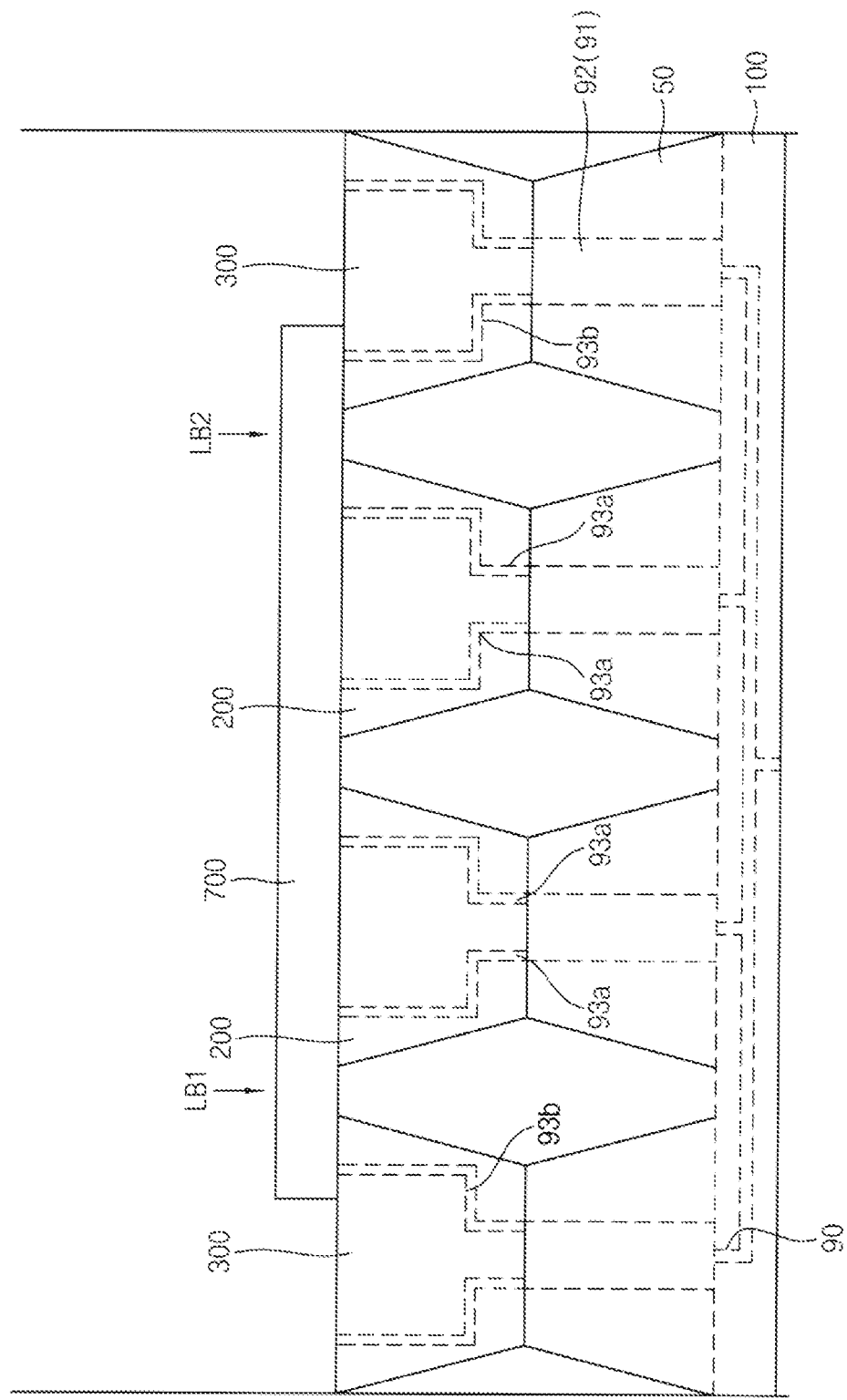
FIG. 22 is a schematic cross-sectional view illustrating the lower plate attached to the internal blocks and the external blocks of FIG. 18.

FIG. 21 is a schematic cross-sectional view illustrating the lower plate 100 not coupled (or not attached) to the internal blocks 200 and the external blocks 300 of FIG. 18. FIG. 22 is a schematic cross-sectional view illustrating the lower plate 100 coupled (or attached) to the internal blocks 200 and the external blocks 300 of FIG. 18.

Referring to FIGS. 21 and 22, each of the internal blocks 200 and the external blocks 300 may have substantially the same height t1, t2, t3, and t4. The length t5 of the coupling portion 92 of each of the internal blocks 200 and the external blocks 300 may be substantially the same as the depth t6 of the through hole 91. Even if the internal blocks 200 and the external blocks 300 are combined with the lower plate 100, the worktable for laser processing may be flat (or substantially flat) without inclination. The workpiece 700 may be flatly disposed to be perpendicular to the laser beams LB1 and LB2.

The worktable for laser processing according to an embodiment replaces only some of the internal blocks 200 and some of the external blocks 300 rather than replacing the entire worktable. Costs may be minimized since a separate worktable for each of the processing shapes may not be required.

Embodiments have been disclosed herein, and although terms are employed, they are used and are to be interpreted in a generic and descriptive sense only and not for purpose of limitation. In some instances, as would be apparent by one of ordinary skill in the art, features, characteristics, and/or elements described in connection with an embodiment may be used singly or in combination with features, characteristics, and/or elements described in connection with other embodiments unless otherwise specifically indicated. Accordingly, it will be understood by those of ordinary skill in the art that various changes in form and details may be made without departing from the spirit and scope of the disclosure as set forth in the following claims.

What is claimed is:

1. A worktable for laser processing comprising:
    a lower plate including:
    a first area;
    a second area surrounding the first area;
    a third area surrounding the second area;
    support parts protruding from the lower plate in the first area and the third area;
    internal blocks disposed on the lower plate in the first area; and
    external blocks disposed on the lower plate in the third area and surrounding the internal blocks, wherein
    a side surface of each of the internal blocks and a side surface of each of the external blocks are inclined such that an area of an upper surface of each of the internal blocks is larger than an area of a lower surface of each of the internal blocks, and an area of an upper surface of each of the external blocks is larger than an area of a lower surface of each of the external blocks, the second area has a polygonal shape and includes a first side parallel to a first direction, a second side parallel to a second direction intersecting the first direction, and a third side parallel to a third direction intersecting the first direction and the second direction, and the internal blocks include:

at least one first internal block having a first shape including a side parallel to the third direction; and second internal blocks having a second shape different from the first shape and not including a side parallel to the third direction.

2. The worktable for laser processing of claim 1, wherein the second area has a uniform width.

3. The worktable for laser processing of claim 2, wherein the internal blocks include the at least one first internal block being adjacent to the third side.

4. The worktable for laser processing of claim 2, wherein the external blocks include at least one external block that is adjacent to the third side parallel to the third direction and has a shape including a side parallel to the third direction.

5. The worktable for laser processing of claim 1, wherein the internal blocks include the at least one first internal block being adjacent to the second area and having an outer shape determined according to a shape of the second area.

6. The worktable for laser processing of claim 1, wherein the external blocks include at least one external block that is adjacent to the second area and has an outer shape determined according to a shape of the second area.

7. The worktable for laser processing of claim 1, wherein an outer shape of a combination of the at least one first internal block and the second internal blocks corresponds to the first area.

8. The worktable for laser processing of claim 1, wherein the internal blocks further include third internal blocks having a third shape different from the first shape and the second shape, and an outer shape of a combination of the at least one first internal block, the second internal blocks, and the third internal blocks corresponds to the first area.

9. The worktable for laser processing of claim 1, wherein the external blocks include first external blocks having a first shape and second external blocks having a second shape, and an outer shape of a combination of the first external blocks and the second external blocks corresponds to the third area.

10. The worktable for laser processing of claim 1, wherein a workpiece including an effective cell portion and a dummy portion surrounding the effective cell portion is disposed on the internal blocks and the external blocks, a boundary between the effective cell portion and the dummy portion is defined as a cutting line, and wherein the cutting line overlaps the second area.

11. The worktable for laser processing of claim 1, wherein the internal blocks are coupled to the lower plate, and the external blocks are coupled to the lower plate.

12. The worktable for laser processing of claim 1, wherein the internal blocks contact each other.

13. The worktable for laser processing of claim 1, wherein the external blocks contact each other.

14. The worktable for laser processing of claim 1, wherein the support parts in the first area are spaced apart from each other by a separation area, and the second area has a uniform width half of a width of the separation area.

15. The worktable for laser processing of claim 1, wherein the lower plate includes a foreign material discharge passage overlapping the second area and formed inside the lower plate.

16. The worktable for laser processing of claim 1, wherein the lower plate includes the support parts protruding from the lower plate in a direction of the internal blocks and the external blocks, and each of the support parts includes a through hole formed inside the support parts, the through hole being attached to the internal blocks and the external blocks.

17. The worktable for laser processing of claim 16, wherein each of the internal blocks includes:

a first suction passage formed inside the each of the internal blocks; and a first coupling portion attached to the through hole, an inside of the first coupling portion is connected to the first suction passage of each of the internal blocks, each of the external blocks includes:

a second suction passage formed inside the each of the external blocks; and a second coupling portion attached to the through hole, and an inside of the second coupling portion is connected to the second suction passage of each of the external blocks.

18. The worktable for laser processing of claim 17, wherein the through hole of one of the support parts, the first coupling portion of each of the internal blocks, the second coupling portion of each of the external blocks, the first suction passage of each of the internal blocks, and the second suction passage of each of the external blocks are connected to each other and have a vacuum state.

19. The worktable for laser processing of claim 1, wherein the internal blocks contact each other, the external blocks contact each other, and a gap between the internal blocks and the external blocks corresponds to the second area.

* * * * *